US006839462B1

(12) United States Patent
Kitney et al.

(10) Patent No.: US 6,839,462 B1
(45) Date of Patent: Jan. 4, 2005

(54) IMAGE SEGMENTATION METHOD

(76) Inventors: Richard I. Kitney, Imperial College, Bagrit Centre, Exhibition Road, London (GB), SW7 2BX; Norman Smith, 66 Woodburn College, Brent Street, London (GB), NW4 2NF ( * ) Notice: Subject to any disclaimer, the term of this patent is extended or adjusted under 35 U.S.C. 154(b) by 0 days.

(21) Appl. No.: 09/331,667
(22) PCT Filed: Dec. 22, 1997
(86) PCT No.: PCT/GB97/03528
§ 371 (c)(1), (2), (4) Date: Feb. 22, 2000
(87) PCT Pub. No.: WO98/28710
PCT Pub. Date: Jul. 2, 1998

(30) Foreign Application Priority Data

Dec. 23, 1996 (GB) .............................................. 5626676

(51) Int. Cl.[7] .............................................. G06T 5/00
(52) U.S. Cl. ....................... 382/173; 382/128; 382/171; 382/225; 382/299
(58) Field of Search .............................. 382/128, 154, 382/170, 171, 173, 225, 299

(56) References Cited

U.S. PATENT DOCUMENTS 5,425,368 A * 6/1995 Brandt ........................ 600/408
5,426,684 A * 6/1995 Gaborski et al. .............. 378/62
6,064,770 A * 5/2000 Scarth et al. ................ 382/225

OTHER PUBLICATIONS

Kandel, A.; "*Fuzzy Techniques in Pattern Recognition*"; John Wiley & Sons, New York, 1982; pp.
Bezdek, James C., "*Pattern Recognition with Fuzzy Objective Function Algorithms*"; Plenum Press, New York, 1981.
Lim and Lee, "On the Color Image Segmentation Algorithm Based on the Thresholding and the Fuzzy C–Means Techniques" Pattern Recognition, vol. 23, No. 9, 1990, Oxford GB, pp. 935–952, XP000159058 see page 937, right–hand column, line 3—see p. 940, left–hand column, line 3 see p. 941, left–hand column, line 9—right–hand column, line 35.

Hall L O et al: "A Comparison of Neural Network and Fuzzy Clustering Techniques in Segmenting Magnetic Resonance Images of the Brain" IEEE Transactions on Neural Networks, vol. 3, No. 5, Sep. 1, 1992, pp. 672–682, XP000299154 see p. 676, left–hand column, line 12—right–hand column, line 26.

Jantzen J et al: "Image Segmentation Based on Scaled Fuzzy Membership Functions" $2^{nd}$ IEEE International Conference on Fuzzy Systems, vol. 2, Mar. 28, 1993–Apr. 1, 1993, New–York NY US, pp. 714–718, XP000371497 see the whole document.

Takashi Mochizuki et al: "Classification of Ultrasonic Images Using Fuzzy Reasoning and Spatial Smoothing Effect of Textural Features" Electronics & Communications in Japan, Part III—Fundamental Electronic Science, vol. 78, No. 6, Jun. 1, 1995, pp. 62–76, XP000551801 see the whole document.

* cited by examiner

*Primary Examiner*—Brian Werner
*Assistant Examiner*—Patrick Edwards
(74) *Attorney, Agent, or Firm*—Nixon & Vanderhye

(57) ABSTRACT

A method of producing a simulated 3-dimensional image, the method comprising: assimilating 2-dimensional image data, e.g. from MR image slices; assigning a feature, e.g. gray scale value to each datum; reducing the resolution of each gray scale value of the data; generating a histogram of the reduced resolution gray scale data; performing a fast fuzzy c-means clustering on the histogram data. The resolution of each pixel object in the images may be reduced from 12 bit to 8 bit resolution, and the histogram may be generated from these. Subsequently a value may be assigned for each entry in the histogram, each entry value being equal to the number of objects of any given feature (e.g. gray scale) in the reduced resolution (8 bit) image. The image may be displayed using a novel color blending technique. A 3D image is produced quickly and without supervisory intervention and can be used in endoscopic surgery and in diagnostic methods as well as in understanding healthy anatomical features better.

9 Claims, 8 Drawing Sheets

IMAGE SEGMENTATION METHOD

The present invention relates to a medical image segmentation method for the purpose of subsequent 3-dimension visualisation.

BACKGROUND OF THE INVENTION 3-dimensional visualisation is useful for the purpose of guiding endoscopic surgery, in planning and rehearsing of surgical techniques and in planning radiotherapy treatments, for example to more accurately target cancerous growths, and also in diagnosis; early detection of subtle structural changes within anatomical regions allows early treatment.

However it is also useful in understanding the anatomy of healthy human or animal bodies.

It has been known for some time that nuclear magnetic resonance (NMR or MR) is sensitive to different biological tissues.

Modern techniques can produce high resolution (MR) images in any anatomical plane either as 2D tomographic or 3D volume data.

Conventionally MR image data is viewed by a clinician on a slice by slice basis. Consecutive slices are printed onto a film and viewed by a light box. The interpretation of the data displayed in this way requires significant skill and even experts may miss subtle variations between image slices.

It is therefore desirable to visualise the MR data directly in 3 dimensions and techniques have been developed to enable this. Several stages are involved. The raw data is first acquired by MR methods. This data undergoes pre-processing techniques including noise filtering and particularly image data classification and/or segmentation. After pre-processing the data is rendered before it can be visualised on an output display. The present invention is particularly concerned with the pre-processing stage of classification (assigning a tissue type to each voxel or pixel) and/or image segmentation (dividing the image into spatial regions). This step essentially clarifies the structures of interest. Known techniques for this stage are either too slow to be of value in real-time applications or require used interaction.

Known rendering techniques are described for example in H. Fuchs, M. Kedem and S. P. Uselton, "Optimal Surface Reconstruction for Planar Contours", *Communications of the ACM,* 20(10), pp. 693–702, 1977. W. E. Lorensen and H. E. Cline, "Marching Cubes: A High Resolution 3D Surface Construction Algorithm", *Computer Graphics,* 21(4), pp. 163–169, 1987. R. A Drebin, L. Carpenter and P. Hanrahan, "Volume Rendering", *Computer Graphics,* 22(4), pp. 65–74, 1988. L. A. Zadeh, "Fuzzy sets", *Information Control,* 8, pp.338–353, 1965.

Given accurately segmented data, surface rendering methods exist to produce a 3D image visualisation. Similarly volume rendering methods may be employed, however these methods do not necessarily demand such rigorous segmentation, instead it is possible to classify the data according to the different tissue types. This is effectively pattern recognition but it only gives rough and ready view and needs refining to produce satisfactory visualisation.

It is possible to volume render classified data directly but there is too much information—all the different tissue types are shown and the actual structures obscured. Volume rendering allows the depiction of fuzzy surfaces (ie, it is possible to "see through" structures).

Known techniques for classification of data require some approximation assumptions and also user interaction. Typical is what is known as the supervised techniques which require supervisory interaction to identify tissue types (for example using a training data set), and assume that the distribution of the data is of a known type eg Gaussian. Such supervision is disadvantageous and impractical in a real time situation An unsupervised technique which is totally data driven is desirable.

Unsupervised, non-parametric approaches which are completely data driven are known and are advantageous since they do not require expert interaction. However, the hitherto known techniques are very slow because the computation required for segmentation of the data is extremely intensive. For the type of large data sets involved in a 3-dimensional image of an anatomical area, processing times of several hours are experienced and this is obviously impractical for real-time visualisation.

SUMMARY OF THE INVENTION

It is an object of the present invention to provide a method of 3-dimensional image segmentation without supervisory intervention which is faster than known methods but produces accurate results.

According to the present invention there is provided a method of classifying 3 dimensional grey scale image data for the purpose of subsequent 3 dimensional rendering, the method comprising:

reducing the resolution of each grey scale value of the data;

generating a histogram of the reduced resolution grey scale value data;

performing a fast fuzzy c-means clustering algorithm (as hereafter defined) on the histogram data.

Preferably the image data is assimilated from magnetic resonance imaging data, which has a good spatial homogeneity and low noise.

In a particular embodiment, the resolution of the grey scale range of each pixel or voxel in the images may be reduced to 8 bit resolution, and a histogram generated from this (typically the resolution will originally be 12 bit. Subsequently a value may be assigned for each entry in the histogram, each entry value being equal to the number of objects of any given feature (e.g. grey scale) in the reduced resolution (8 bit) image.

According to a second aspect of the present invention there is provided a method of viewing fuzzy classified data comprising using data classified into c clusters, defining a colour space of c-1 equally spaced pseudo dimensions, assigning the cluster corresponding to no signal to the dimensional origin, assigning a pseudo dimension in the colour space to each other cluster giving a value in each dimension to each pixel, which value is proportional to the fuzzy membership of the pixel or voxel in the respective cluster to which the pseudo dimension is assigned, and displaying a visual image by re-generating the pixels or voxels according to their assigned values and pseudo dimensions.

The second aspect of the invention therefore provides a form of colour blending display which enables the fuzzy nature of the classification to be accurately viewed. However, for the purpose of ultimate rendition this displays the data by tissue type rather than by structure and some details may be obscured in certain circumstances. Thus other display methods are contemplated which methods will be well within the knowledge and capabilities of a person skilled in the relevant field of technology.

Methods in accordance with the invention may thus be used to achieve a general delimitation of anatomical areas quickly. The invention can also provide a first step as a preliminary towards better and higher definition 3D visualisations if further processing steps are introduced.

BRIEF DESCRIPTION OF THE DRAWINGS

For a better understanding of the present invention and to show how the same may be carried into effect, specific details of methods according to the invention will now be described, by way of example, and reference will be made to the following illustrations.

DETAILED DESCRIPTION OF THE DRAWINGS

Figure 1:
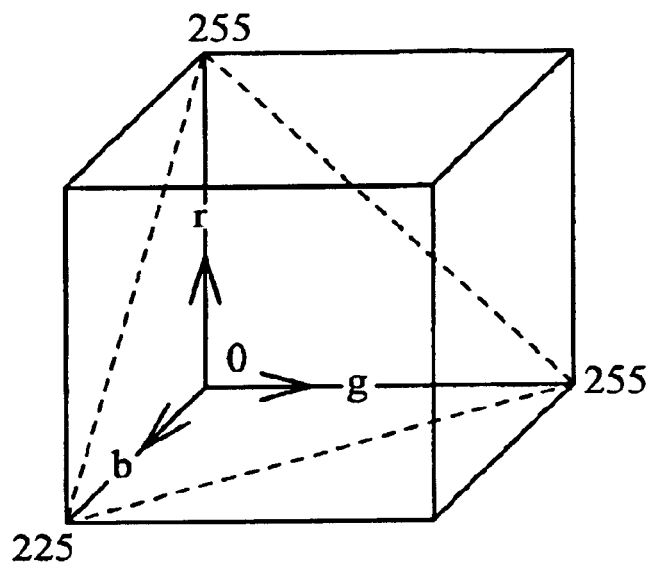
FIG. 1 is a schematic illustration of a colour space for a segmented image with 4 clusters to illustrate a method according to the second aspect of the invention.

Fuzzy set theory is a generalisation of conventional set theory that was introduced by Zadeh (Information Control, 8, pp. 338–353, 1965) as a way to represent vagueness in everyday life. Let $X=\{x_1, x_2, \ldots, x_n\}$ be a set of finite objects. X may be partitioned into two different types of subsets. Conventional subsets, which are referred to as hard or crisp, will either contain or not contain objects of X. On the other hand, fuzzy subsets may not necessarily uniquely contain objects of X. Let A be a fuzzy subset of X. A may be defined by it's membership function as, $u_A: X \rightarrow [1,0]$. If $_A u(X)=0$ the object X does not exist within subset A, whereas if $u_A(X)$ takes a value between 0 and 1, this signifies the degree of membership of X in subset A.

A 2-dimensional image is made up of an array or 2-dimensional matrix of pixels; a 3-dimensional image is made of a 3-dimensional matrix of voxels. In the context of pattern recognition systems each pixel or voxel is known as an object and the set of pixels or voxels making up the image is object data. Apart from its position in the image, each object (pixel or voxel) will have features or characteristics associated with it. For general images there may be different measures of image texture or contrast and for magnetic resonance images typical features are grey scale values associated with different magnetic resonance parameters such as T1, T2 or proton density. In a medical image these features represent tissue type. An image may be represented by a matrix:

$$X=n\{\underline{x}_1, \underline{x}_2, \ldots \underline{x}_n\} \text{ n=total number of objects in the image}$$

$\underline{x}_k$=k'th object $x_j K$=the j'th characteristic or feature associated with object k p=total number of features for any one object.

In segmenting the image therefore, the object data is classified by being divided into clusters or partitions according to these features. Each cluster corresponds to a specific type of region in the image, for example a different tissue type where the image is a medical one. The division into clusters may be done by hard or crisp set theory so that each object is assigned to the cluster to which it has the highest probability of belonging. Preferably however fuzzy set theory is used wherein each object may be assigned to several clusters in a proportion depending upon its degree of membership in each cluster. Evidently for any one object, the sum of its memberships in all the partitions (clusters) must add up to one. A formal definition of a fuzzy partition space may be stated as follows:

$$\text{Let: } X=\{\underline{x}_1, \underline{x}_2, \ldots \underline{x}_n\} \text{ be a finite set of object data}$$

$V_{cn}$=the set of real c×n matrices c=an integer denoting the number of partitions in the data set $2 \leq c < n$ Then the fuzzy c-partition space for X is defined as the set:

$$M_{fc} = \left\{ U \in V_{cn} \mid u_{ik} \in [0,1] \forall i,k; \sum_{i=1}^{c} u_{ik}=1; 0 < \sum_{k=1}^{n} u_{ik} < n \forall i \right\} \quad (1)$$

U=specific partition matrix corresponding to a unique fuzzy partition.

$u_{ik}$ (each entry)=membership of the k'th element in the i'th subset of the entire hard set.

$u_{ik}$ may take any value between 0 and 1. There exist an infinite number of U matrices in fuzzy partition space, $M_{fc}$. Thus, there exist an infinite number of potential fuzzy segmentation solutions.

In order to obtain an accurate fuzzy segmentation solution, there are many available techniques. One example is the FCM (Fuzzy C-means) clustering algorithm which performs extremely well with MR images and was originally devised by Bezdek and described in *Pattern Recognition with Fuzzy Objective Function Algorithms*, Plenum Press, New York, 1981 and by Kandel A in: *Fuzzy Techniques in Pattern Recognition*, John Wiley and Sons, New York 1982.

Bezdek defined the fuzzy object function $J_m: M_{fc} R^{cp} \rightarrow R$ as $$J_m(U,v) = \sum_{k=1}^{n} \sum_{i=1}^{c} (u_{ik})^m (d_{ik})^2 \qquad (2)$$

where n is the number of image pixels c is the number of partitions, or region (eg tissue) types in the data $d_{ik}=\|x_k-v_i\|$ is the distance between $x_k$ and $v_i$, $\|-\|$ being any suitable norm on $R^p_i$ p dimensional space. $v_i$ is the fuzzy cluster centdroid as defined by Bezdek in his book detailed above, $U \cdot \epsilon M_{fc}$ is a fuzzy c-partition of X and $_m\epsilon[1,oo)$ is the fuzzy weighting exponent.

The solution which results from minimising the above defined objective function, $J_m$ (U, v), yields an optimal fuzzy segmentation. The full algorithm is described by Bezdek in his book.

The conventional FCM algorithm is too general to perform efficiently and fast enough for its real time implementation. The invention considers a new approach in which various approximations and simplifications are introduced to allow a very much quicker and more effective segmentation to be performed.

When working with natural texture generated images, the consideration of texture features improves the segmentation compared with segmentation resulting from the clustering of only grey scale data. However, for meaningful results, the complex process of feature reduction is a necessary prerequisite. Furthermore, positive results are only obtained when using tailor-made texture generated images. When texture features are extracted from MR images and used during clustering, the results have been quite poor. When using grey scale alone, better segmentation results are obtained than when using any combination of texture features. Segmentation results are sometimes improved when using multi-spectral features, e.g. T1, T2, proton density, etc., although feature reduction is sometimes necessary- to optimise the results.

Therefore, in order to optimise the segmentation of MR images, the invention considers grey scale as the only feature. Although using multi-spectral data takes longer to acquire and may improve the segmentation, this will not be significant and does not justify the extra computation required. Furthermore, multi-spectral data takes longer to acquire and is not always available.

Carrying out the fast fuzzy C-means (FFCM) Cluster algorithm of the invention involves two stages.

First of all, a reduced resolution grey scale histogram is produced from the original image data. Next the values of the histogram are clustered using an approximated and simplified form of the traditional FCM algorithm. This will now be described in greater detail.

Typically, MR images are acquired in a 12 bit format. In order to reduce the required computation during the clustering process, the pixel values are reduced to an 8 bit resolution. A histogram, f, is then generated from the new lower resolution pixel values. The value of each entry f(g), is equal to the number of times pixels, of grey scale value g, occur within the 8 bit image.

By using the newly generated values, f (g), of the reduced resolution histogram, an approximated form of equation (2) may be written as equation (3):

$$J_m(W,v) = \sum_{g=G_{min}}^{G_{max}} \sum_{i=1}^{c} f(g)(w_{ig})^m (d_{ig})^2 \qquad (3)$$

where $d_{ig}=\|g-v_i\|$ is the Euclidean distance between the grey scale value g and $v_i$.

$v_i$ is the fuzzy centroid of cluster i as defined in equation (6).

w is a fuzzy partition of the histogram data whose entries $w_{ig}$ correspond to the membership value of each grey scale value g in cluster i of the image c is the number of clusters, or tissue types, in the image.

$G_{min}$ and $G_{max}$ are the minimum and maximum grey scale values in the image, respectively.

f(g) is the frequency of grey scale value g in the image and m $\epsilon[1,oo)$ is the fuzzy weighting exponent.

If the values from a histogram generated from the original 12 bit image are used, the r.h.s. of equations (2) and (3) are in fact equivalent.

The approximate form of the equation shown at (3) using 8 bit data effectively requires clustering of only 256 values rather than the thousands needed for 12 bit data and speeds up the calculations by a factor of 16.

The resulting W partition after minimising the fuzzy object function $J_m(W_1,v)$ gives an optimal fuzzy segmentation solution of the image data. This is obtained by using the following theorem:

THEOREM 3.1. Fix m$\epsilon$(1,oo) and let f(g) have at least c<($G_{max}-G_{min}$+1) distinct points. Define $\forall$g the sets $I_g=\{i | 1 \leq i \leq c;\ d_{ig}=|g-v_i|=0\}$ $\tilde{I}=\{1,2,\ldots\}-I_g$ then (W, v) $\epsilon M_{fc} \times R^c$ may be globally minimum for $J_m$ only if either or $$I_g = \phi \Rightarrow w_{ig} = 1 \bigg/ \left[\sum_{j=1}^{c} \frac{d_{ig}^{2/(m-1)}}{d_{jg}}\right] \text{ or} \qquad (4)$$

$$I_g \neq \phi \Rightarrow w_{ig} = 0\ \forall\ i \in \tilde{I}_g \text{ and } \sum_{i \in I_g} w_{ig} = 1 \qquad (5)$$

$$v_i = \sum_{g=G_{min}}^{G_{max}} (w_{ig})^m f(g)g \bigg/ \sum_{g=G_{min}}^{G_{max}} (w_{ig})^m f(g) \forall\ i \qquad (6)$$

This theorem is derived by fixing v $\epsilon R^c$ and applying Lagrange multipliers to the variables $\{w_{ig}\}$. The proof for Bezdek's theorem for the FCM algorithm may be easily extended to theorem 3.1.

$J_m$ (W,v) may be minimised by implementing the following algorithm which fulfills theorem 3.1 at each stage:

ALGORITHM 3.1. The following procedure is implemented:

1. Fix c, $2 \leq c < (G_{max}-G_{min}+1)$; Fix m, $1 \leq m \leq \infty$. Initialise $W^{(0)} \epsilon M_{fc}$. Then at step 1, l=0,1,2 . . . :
2. Calculate the c fuzzy cluster centres $\{v_i^{(l)}\}$ using equation 6 and the values of $W^{(1)}$.
3. Update using equations (4) or (5) and $(v_i^{(l)})$.
4. Compare $W^{(l)}$ to $W^{(l+1)}$ in a convenient matrix norm: If $\lambda W^{(l+1)}-W(l) \leq E_L$ stop; otherwise, set l=l+1 and return to stage 2.

This is effectively a fast fuzzy c-means algorithm.

The next stage of the new segmentation algorithm is to translate the values of the fuzzy histogram partition, W, into a meaningful visual output. A novel colour blending approach, which does this very task, will now be described.

Colour coding has been a popular approach for the display of fuzzy segmented MR images. Bezdek et al describe an elementary method which first defuzzifies the fuzzy partition. This is done by assigning each pixel unique membership of the cluster in which it has the highest fuzzy membership. The defuzzified image is then displayed by assigning each cluster a particular colour. This approach loses the benefit of a fuzzy approach to segmentation. Hall et al also defuzzifies the segmented image and assigns a particular colour for each cluster. However, the brightness of the colour which they assign to each pixel is set proportional to its highest fuzzy membership.

These above described approaches are all limited by the degree to which they are able to convey the full implications of the fuzzy classification in the final visual display. This is because a fuzzy classified image will have pixels or voxels which may belong to more than one cluster. Sometimes, a pixel or voxel may have similar membership to a number of clusters. The approach developed by Hall et al only displays the degree to which any pixel belongs to the cluster of its highest membership and hides any information regarding the degree of memberships in other clusters. It is for this reason that the following new colour blending approach is proposed.

This new technique involves working with an RGB (red-green-blue) colour model and assigns each cluster a particular colour. FIG. 1 shows a colour space defined by the RGB model. In the Figure this is made up of a discrete 8 bit space. It has three principal axes, defined by the unit vectors r, g and b, which correspond to the colours red, green and blue respectively. The origin of the space corresponds to the colour with no RGB components, namely black. Each principal axis has values ranging from 0 to 255. As the values increase along, for example the r axis, the brightness of the colour red increases until it reaches its maximum when r=255 and similarly for the other axes. The extremes of each axis may be defined by the vectors, $\underline{R}$, $\underline{G}$ and $\underline{B}$. Where $\underline{r}=\underline{g}=\underline{b}=255$, i.e. R+G+B—the corner diametrically opposite the origin, the RGB space has reached full saturation and therefore corresponds to the colour white.

Consider an MR image after it has been segmented into four fuzzy clusters. One of these four clusters will correspond to the region of the image which represents no MR signal. This is the region of the image with pixels of zero or very low grey scale intensity. There is no need to assign this region any colour at all. The other three clusters may then be arbitrarily assigned the colours red, green and blue. Thus, any pixel of grey scale value g, after fuzzy segmentation will be assigned the colour defined by the vector $Y_g$, where $$Y_g = w_{2_g}R + w_{3_g}G + w_{4_g}B_1 \quad 0 \leq \sum_{i=2}^{2} w_{ig} \leq 1 \qquad (7)$$

This allows pixels which have memberships in more than one cluster to be viewed as such by the blending of the basic colours assigned to the individual clusters. Due to the constraint of a fuzzy partition, not all the RGB space may be utilised for colour blending. The space used is the volume which contains all the possible vectors $Y_g$. This is the volume confined by the tetrahedron joining the origin and the vertices of the three principal axes as shown in FIG. 1.

Figure 2:
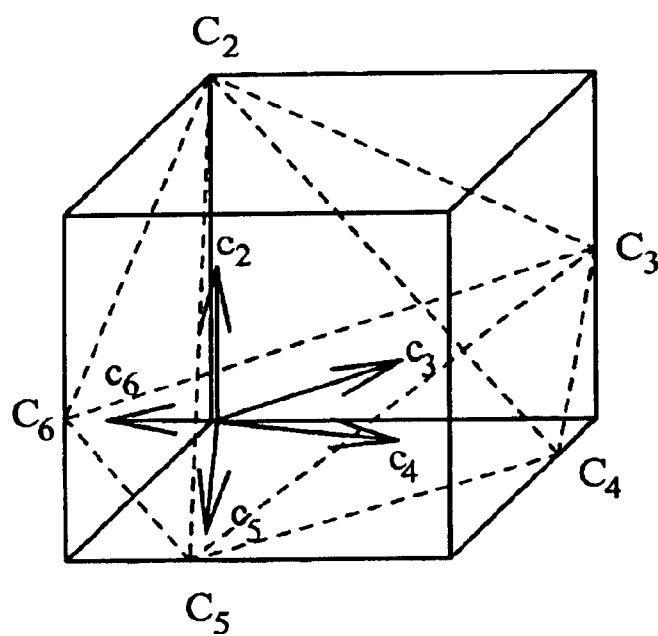
FIG. 2 is a schematic illustration of a colour space for a segmented image with 6 clusters to illustrate a method according to the second aspect of the invention.

If an MR image is segmented into more than four clusters, ideally a colour space which is of more than three dimensions should be used if it is to possess more than three linearly independent principal axes. However since the RGB model is only 3-dimensional, a pseudo multi-dimensional space must be defined within the existing 3D RGB space. FIG. 2 shows an example of such a space which has been created for an image segmented into six clusters. As with the image segmented into four clusters, the cluster corresponding to no MR signal is not assigned any colour. The other five clusters are assigned colours according to the axes $C_2$ to $C_6$, which are spaced equally apart along the faces of the r-g, g-b and b-r planes. A pixel with unique membership to cluster i, is assigned the colour defined by the vector $C_i$. The entire space available for colour blending is the sum of all the tetrahedral volumes as depicted in FIG. 2. For the general case, where an MR image is segmented into c clusters, the colour assigned to any pixel of grey scale value g, $Y_k$, is defined by the equation $$Y_g = \sum_{i=3}^{c} w_{ig}C_i, 0 \leq \sum_{i=2}^{c} w_{ig} \leq 1 \qquad (8)$$

The entire colour space available for colour blending is that which contains all the possible vectors $Y_g$.

Figure 3:
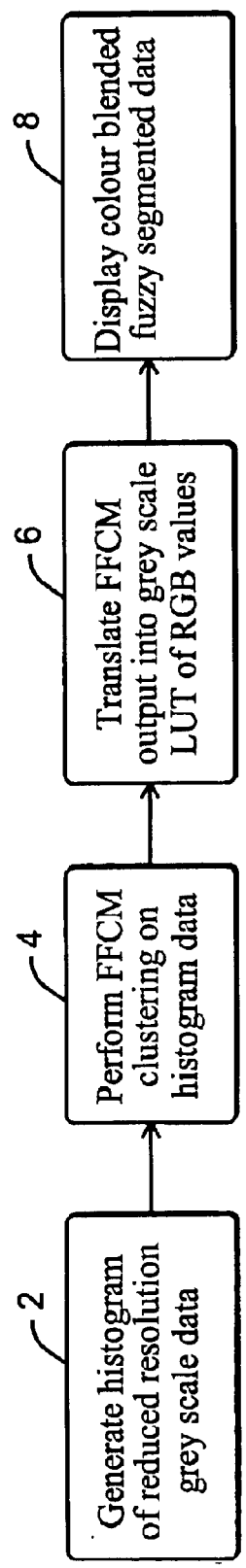
FIG. 3 is a flow chart illustrating the invention.

The overall process of the new segmentation algorithm is summarised in FIG. 3.

Thus the grey scale data for each pixel is first reduced in resolution (from 12 bit typically to 8 bit), then a histogram (2) is generated of the reduced resolution grey scale data.

Subsequently, the new fast fuzzy c means (FFCM) clustering technique (4, 6, 8) is performed on the histogram data.

Experimental results obtained using the method of the present invention will now be described.

Images of a knee and of a brain were acquired by an IGE Sigma Tesla Advantage scanner. The brain data set comprises 124 coronal slices and the knee data comprises 30 slices. T1 protocols were used to acquire 124 slices of 256×256 resolution head data, and 30 slices of 256×256 resolution knee data.

The data sets were weighted and both FCM and the new FFCM techniques were used on both sets. The results are compared for quality and speed of acquisition.

Firstly it is necessary to choose a value for c, the number of fuzzy clusters, to result from the segmentation. Various researchers have investigated automatic methods for measuring cluster validity, i.e. the optimal number of clusters in an image. For example Bezdek addresses this in his book (see above) and the subject is also discussed by J. Gath and A. B. Geva in "Unsupervised Optimal Fuzzy Clustering" *IEEE Transactions on Pattern Analysis and Machine Intelligence*, 11(7), pp. 773–781, 1989.

However, it is possible to produce a good segmentation for more than one value of c as data are separated into successively finer substructures. In fact, to a large degree, the decision for the optimal number of clusters is subjective and application dependent. It is for this reason that the number of clusters in this example was chosen manually. In addition to setting a value for c, first guess values must be chosen of the fuzzy partition $U^{(0)}$ for the FCM, and of $W^{(0)}$ for the FFCM (see step 1 of algorithm 3.1). It is possible to simply choose random values, which satisfy equation (1), however, the inventors have found that by dividing the grey scale histogram into c equally spaced regions and assigning values to $U^{(0)}$ or $W^{(0)}$ accordingly, the algorithms converge nicely towards their respective global minima. It is also necessary to set the value of the fuzzy index, m, before beginning.

Figure 4:
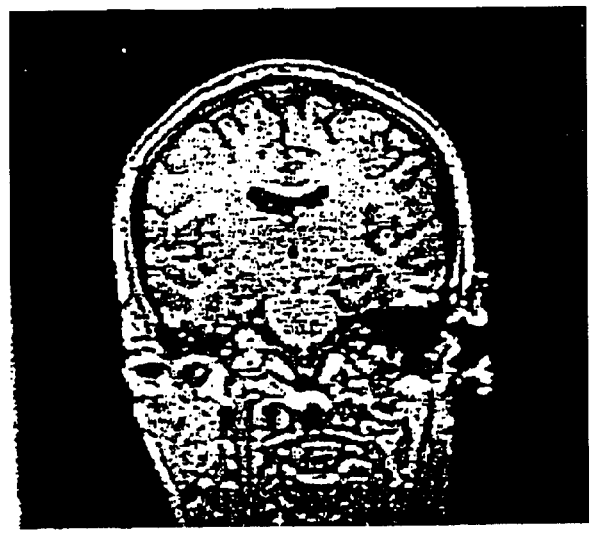
FIG. 4 shows an image slice of coronal head data (slice 62) from around the middle of a data set.
Figure 5:
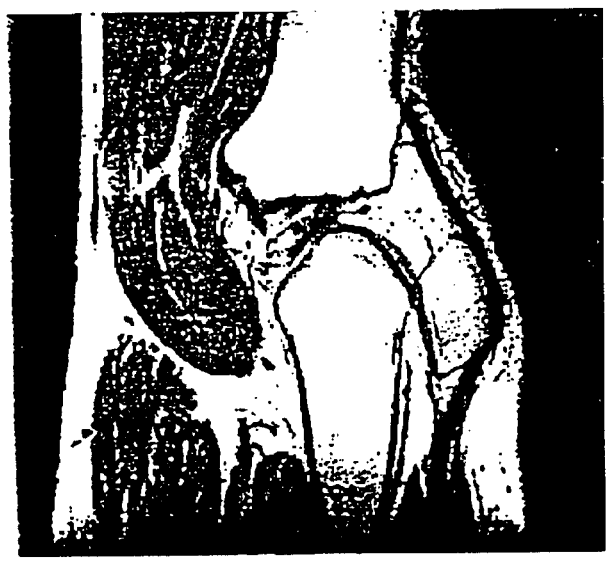
FIG. 5 shows an image slice of knee data (slice 15) from around the middle of a data set.

FIGS. 4 and 5 show image slices from around the middle of each of the data sets for head data and knee data respectively. The performance of the new segmentation algorithm on these images will now be discussed.

Figure 6:
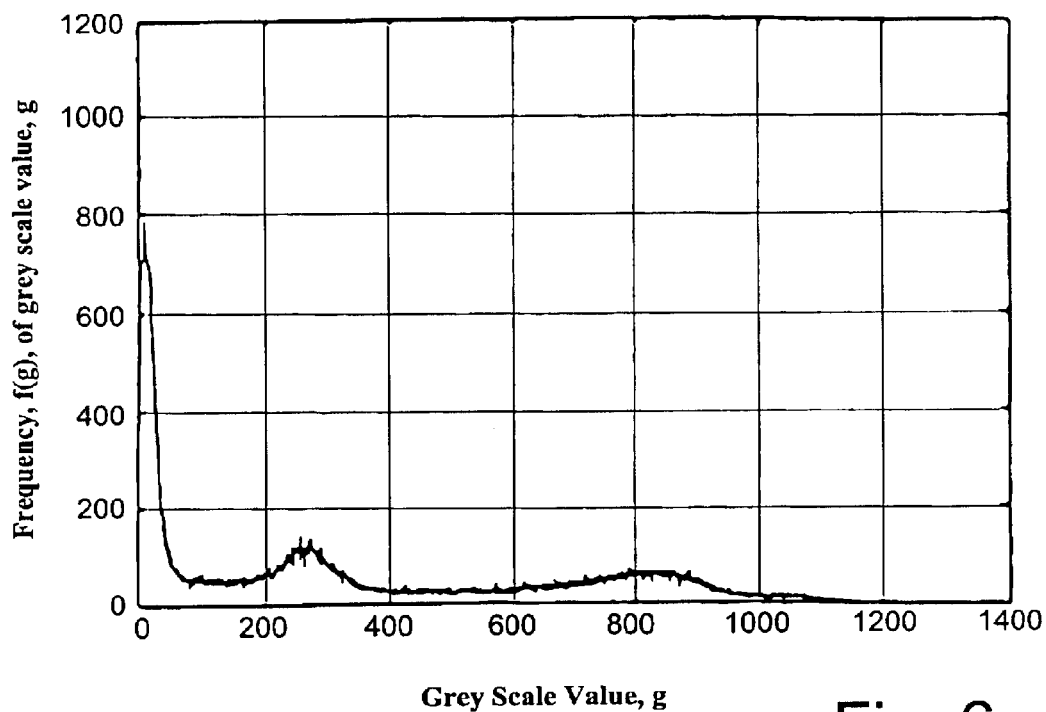
FIG. 6 is a histogram of original 12 bit data from the image slice of the knee data shown in FIG. 5.
Figure 7:
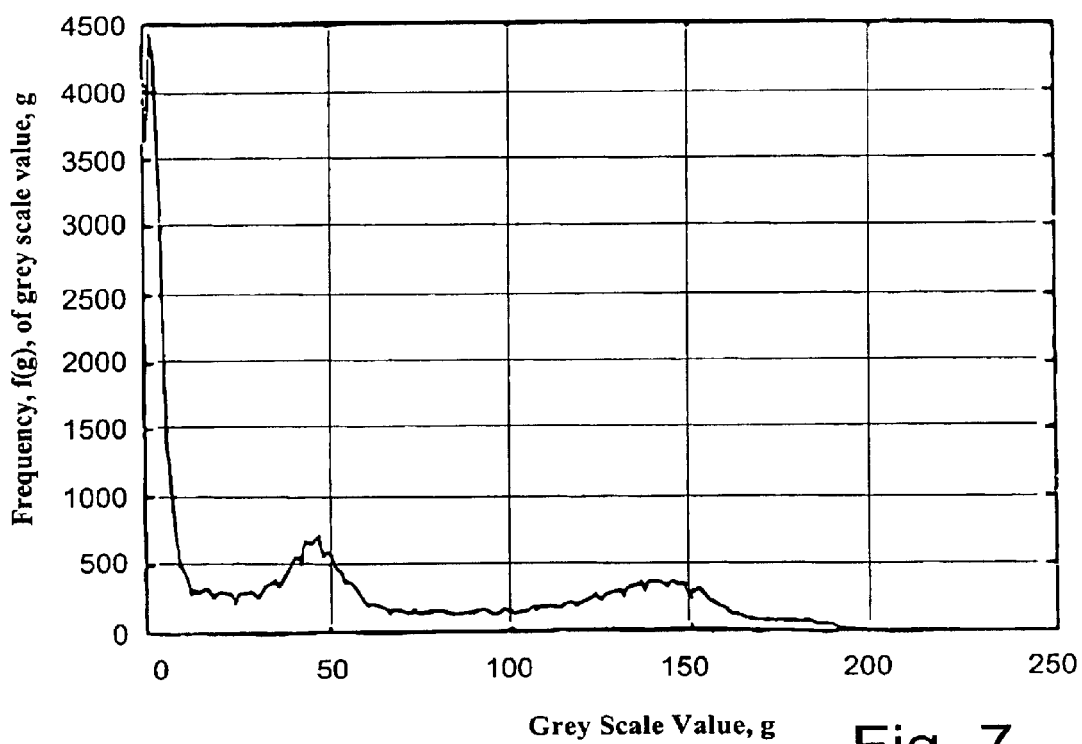
FIG. 7 is a histogram of reduced resolution 8 bit data from the image of knee data shown in FIG. 5.
Figure 8:
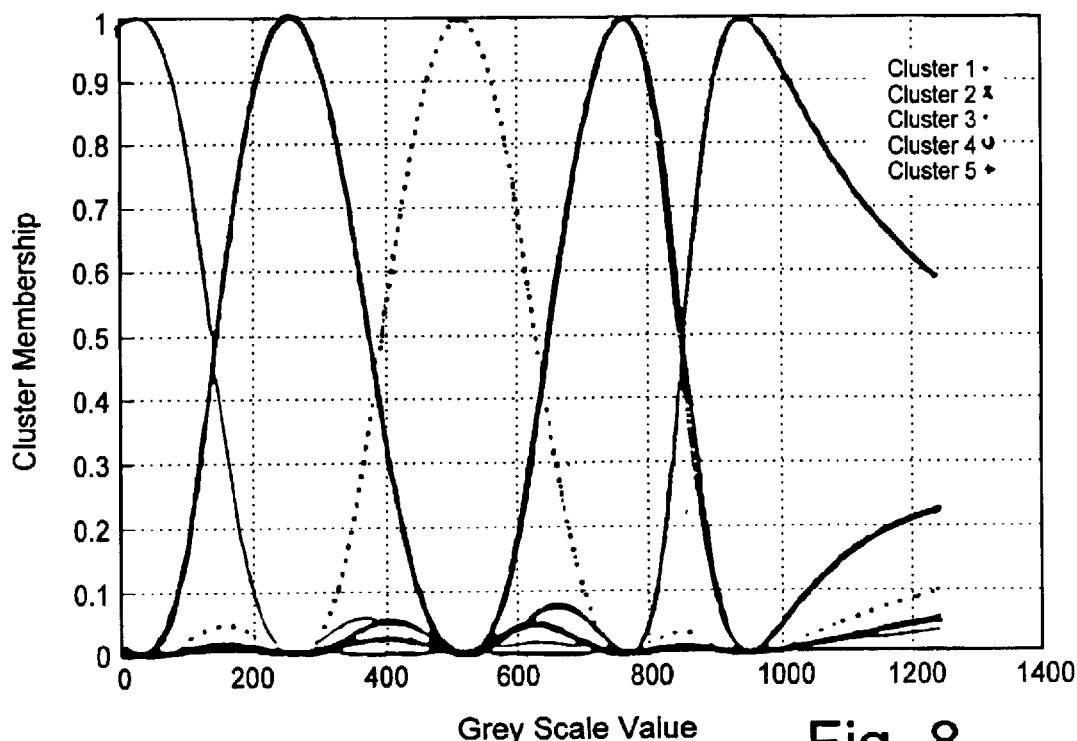
FIG. 8 is a plot of cluster membership after performing FFCM on the knee data of FIG. 5 using the grey scale histogram generated from the original 12 bit data image.
Figure 9:
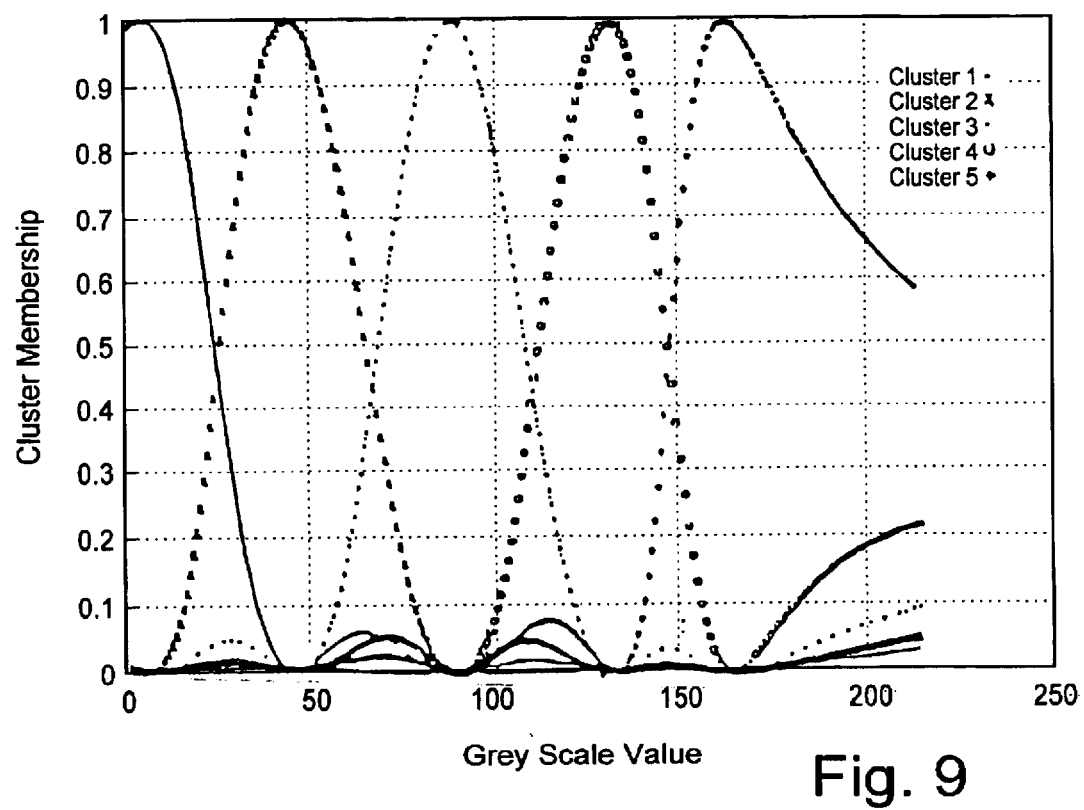
FIG. 9 is a plot of cluster membership after performing FFCM on the knee data of FIG. 5 using the grey scale histogram generated from the reduced resolution 8 bit image.

FIG. 6 shows a histogram, f, of the original 12 bit grey scale data from the knee image (as shown in FIG. 5) and FIG. 7 shows the histogram, f, of the reduced resolution 8 bit data from the same image. It should be noted that the reduction in resolution does not have any significant effect on the shape of the histogram data. FIGS. 8 and 9 show plots of the final W partitions after the clustering stage of the FFCM has converged, after inputting 12 bit and 8 bit histogram data, respectively. The shapes of the two plots are very similar despite the lower resolution of the histogram of FIG. 7. This is because the essential shape of the histogram was preserved even after reducing the grey scale resolution.

Figure 10:
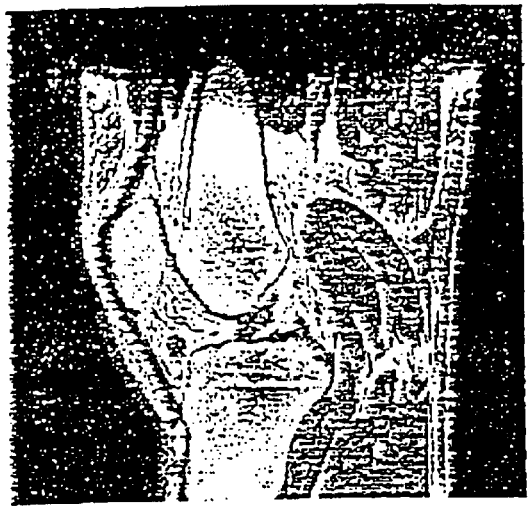
FIG. 10 is a colour blended display of 2-dimensional segmented T1 weighted MR image knee data (slice 15) after FCM.
Figure 11:
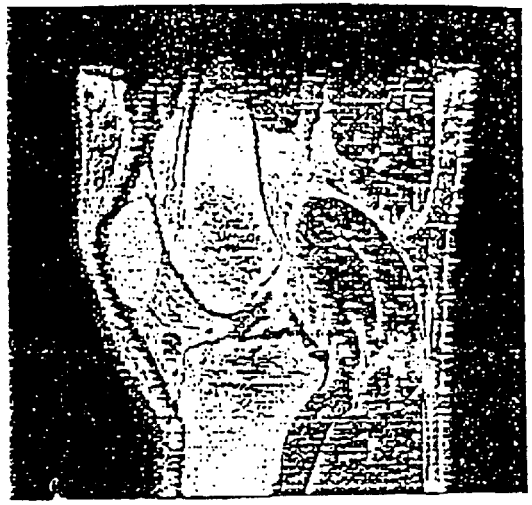
FIG. 11 is a colour blended display of 2-dimensional segmented T1 weighted MR image knee data (slice 15) after FFCM.

Finally, FIGS. 10 and 11 show the final colour blended results after using both the original 12 bit data and the reduced resolution 8 bit data. Visually, these images appear to be absolutely identical. The actual difference between the image values was computed and the insignificant error of 0.77% was measured. Furthermore, the reduction in resolution results in 7 times less computation during the clustering stage of the FFCM, from the 8 bit data, than from the original 12 bit data. If the original image grey scale data were to occupy the full 12 bit range, by reducing its resolution to 8 bits, the required computation would drop by a factor of 16. Although the error might be slightly greater for such a case, it would still be insignificant and visually not detectable. It should be noted that the only error introduced to the FFCM algorithm is that resulting from the reduced grey scale resolution: otherwise, it produces an identical result to its original FCM counterpart.

Figure 14:
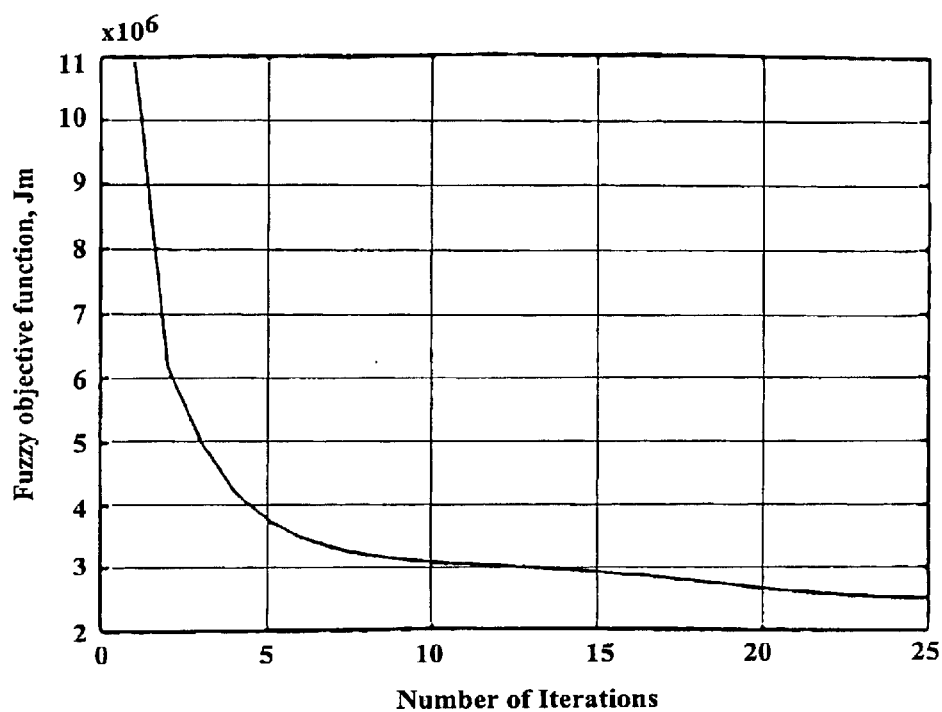
FIG. 14 is a plot of convergence of the fuzzy objective function $J_m(W,v)$ after 25 iterations of brain data.
Figure 15:
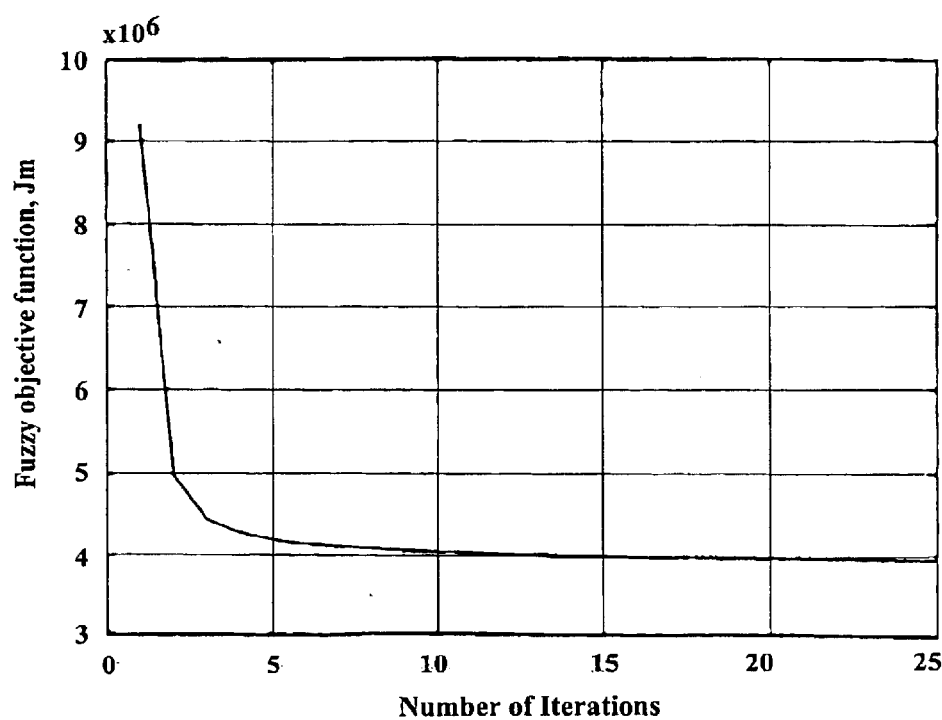
FIG. 15 is a plot of convergence of the fuzzy objective function $J_m(W,v)$ after 25 iterations of knee data.

The way in which the fuzzy objective function $J_m(W,v)$ converges towards a global minimum is demonstrated in FIGS. 14 and 15. It may be seen, from FIG. 14, that with the brain data, after about 20 iterations, the objective function $J_m(W,v)$, approaches very close towards its global minimum. Although, it does progressively decay after further iterations of the clustering algorithm, the change is very minor and there is no visual difference in the resulting segmentation. FIG. 15 shows how, with the knee data, the fuzzy objective function $J_m(W,v)$ almost reaches its global minimum after only 10 iterations. The reason for this is that with the knee data, the first guess values for $W^{(0)}$ are closer to the final result of W than with the brain data. It is impossible to predict how many iterations are likely to be required for the algorithm to converge. However, because of the speed of this new method, it is possible to be conservative and err on the safe side and always allow for 30 iterations. This should guarantee convergence with any types of image data.

The value chosen for the fuzzy weighting index, m, alters the degrees of "fuzziness" of the segmented data. There is no theoretically optimal value for m. However, it is easy to see from equation (6) that as $m \to \infty$, $W_{ik} \to (1/c)$ $\forall i, k$, i.e. the image reverts to noise. It has been found that setting m=2.0 produces a particular good result. The images shown in FIGS. 10 to 13 are all outputs of the FFCM after setting m=2.0. Note how the various structures naturally blend into each other.

As discussed earlier, there is no easy way of determining the optimal value of c. After showing segmented images, with different values of c, to an expert radiologist, it was found that for brain data, setting c=4, as for knee data C=5, yielded the best results.

Figure 12:
FIG. 12 is a colour blended display of 2-dimensional segmented T1 weighted MR image head data (slice 62) after FFCM.

The colour blended scheme provides a true fuzzy display for the segmented data. With the images shown in FIGS. 10 to 13, the various tissue type were assigned different colours in accordance with visual criteria; for example, for the brain data, as shown in FIG. 12, the fluid tissue was assigned the colour red, the grey matter was assigned the colour green and the white matter the colour blue. Again, the cluster corresponding to very low MR signal was not assigned a colour. Note how the colour blended display allows the various colours to blend into each other as structures transcend into one another. It should be pointed out, that although the colour assignment used in this work was as defined by equation (8), the actual colour assignment may instead be equally chosen manually. Thus, clinicians can label each tissue according to the colours of their choice. So long as the contrast between the chosen colours within RGB colour space is reasonable, the fuzzy blending between the different structures will be maintained.

The actual times of computation of the FCM and FFCM algorithms were measured while running the software on a DEC alpha workstation. It was found that the traditional FCM algorithm took almost two and a half minutes to perform 30 iterations on each image slice with c set to 5. For a 3D data set comprising 124 slices, the computation time exceeded five hours. With the new method, only the histogram data is being clustered. The amount of histogram data is independent of the number of pixels or voxels in the image. Thus this method is able to achieve performances of less than one second even when segmenting large 3D data volumes.

Figure 13:
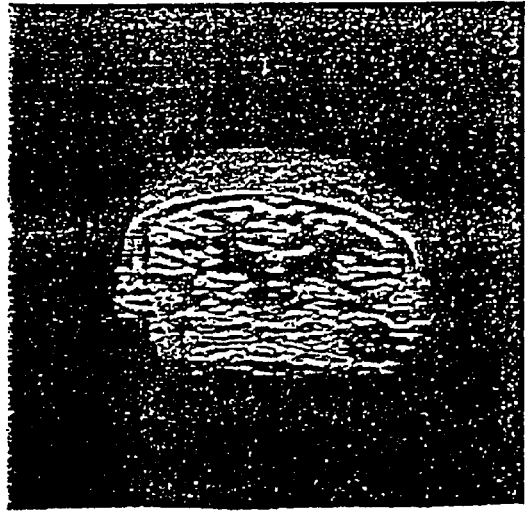
FIG. 13 is a colour blended display of voxel rendered brain data from a slice through the middle of a head (slice 62).

FIG. 13 shows the results after voxel rendering segmented brain data by a rendering method described in the article "Volume Rendering" by Drebin referred to above. In this case, only the back half of the head is being viewed from a position slightly below the head. It should be noted from this result that only the outer layer of the head can be distinguished clearly in three dimensions. Although it is possible to adjust the opacity assignment of the various tissue types such that they may be made either opaque or transparent.

It is envisaged that the new methods proposed by this invention, and particularly the FFCM method of classifying data, will be used in many applications other than the particular example described here.

Further refining techniques can be applied for example adaptive spatial processing could be performed in real time by FFCM methods and thus actual structure may be isolated or removed from an image while still preserving the fuzzy display.

Figure 16:
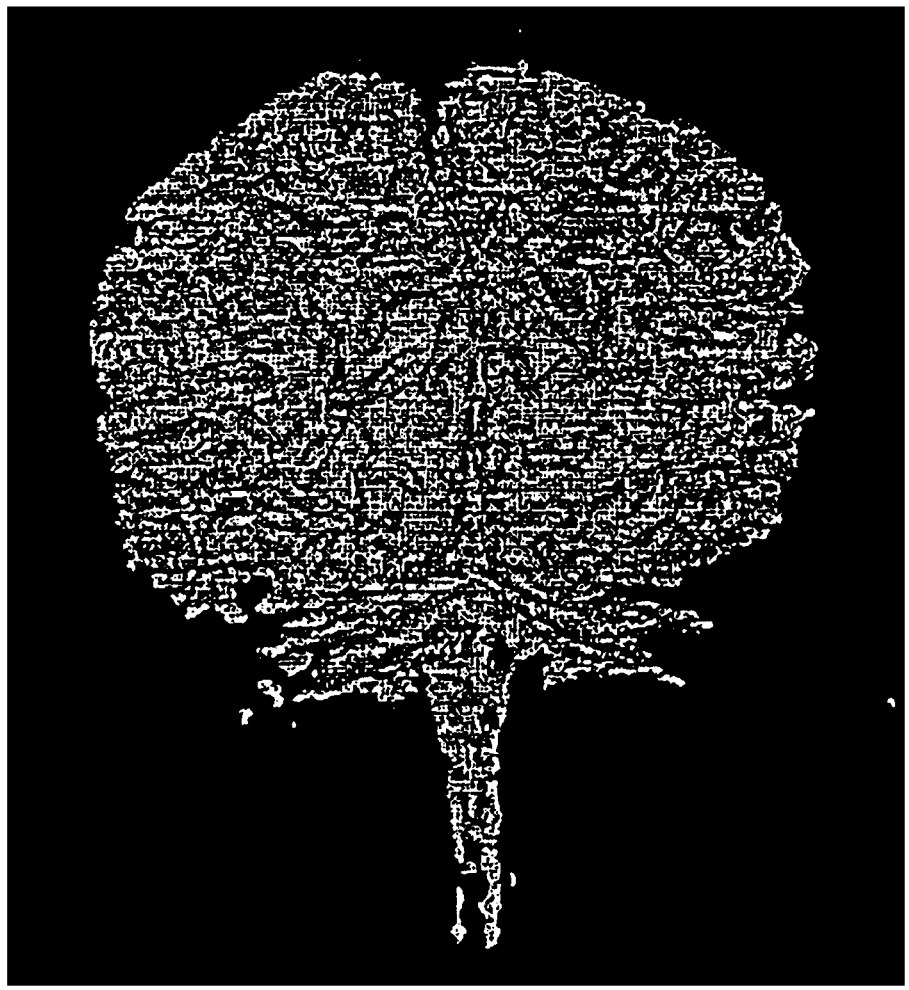
FIG. 16 is an image of brain data.

In some cases anatomical structures may be directly extracted from the from classified data and such is shown in the brain image in FIG. 16.

What is claimed is:

1. A method of classifying grey scale image data according to different region types within the image, the method comprising:

assigning a single feature value to each datum;

reducing the resolution of each value of the data;

generating a histogram of the reduced resolution value data; and, performing a fast fuzzy c-means clustering algorithm on all of the histogram data, so as to minimize a fuzzy object function $J_m(W, v)$, wherein $J_m(W, v)$ is defined by the equation $$J_m(W, v) = \sum_{g=G_{\min}}^{G_{\max}} \sum_{i=1}^{c} f(g)(w_{ig})^m (d_{ig})^2,$$

using generated values f(g) of said reduced resolution histogram, and wherein:

c represents a number of clusters in the image;

$G_{min}$ and $G_{max}$ represent respectively a minimum and maximum grey scale value q in the image;

m is a fuzzy weighting exponent;

w is a fuzzy partition of the histogram data with entries $w_{ig}$ which correspond to a membership value of each grey scale value g in a cluster i of the image; and, $d_{ig}$ is a Euclidian distance between a grey scale value q and $v_1$.

2. A method according to claim 1 wherein the image data is assimilated from magnetic resonance imaging data.

3. A method according to claim 2 wherein the magnetic resonance data is segmented by generating a histogram of reduced resolution object data.

4. A method according to claim 1 wherein the feature assigned to each object datum is a grey scale value.

5. A method according to claim 1 wherein the resolution is reduce from 12 bits to 8 bits.

6. A method according to claim 1 wherein a value is assigned for each entry in the histogram, each entry value being equal to the number of objects of the given feature in the reduced resolution histogram.

7. A method of classifying grey scale image data according to claim 1, further comprising defining a color space of c-1 equally spaced dimensions, assigning the cluster corresponding to no signal to the dimensional origin, assigning a dimension in the color space to each other cluster giving a value in each dimension to each pixel, which value is proportional to the fuzzy membership of the pixel in the respective cluster to which the dimension is assigned, and displaying a visual image by re-generating the pixels according to their assigned values and dimensions.

8. A method according to claim 7 wherein the output of the fast fuzzy c-means (ffcm) clustering is translated into a grey scale LUT of RBG (Red/Blue/Green) values.

9. A method according to claim 8 further comprising the step of displaying the color blended fuzzy segmented data on a VDU.

\* \* \* \* \*